K. MURDOCK.
DRINKING FOUNTAIN.
APPLICATION FILED JAN. 2, 1912.
1,218,797.   Patented Mar. 13, 1917.
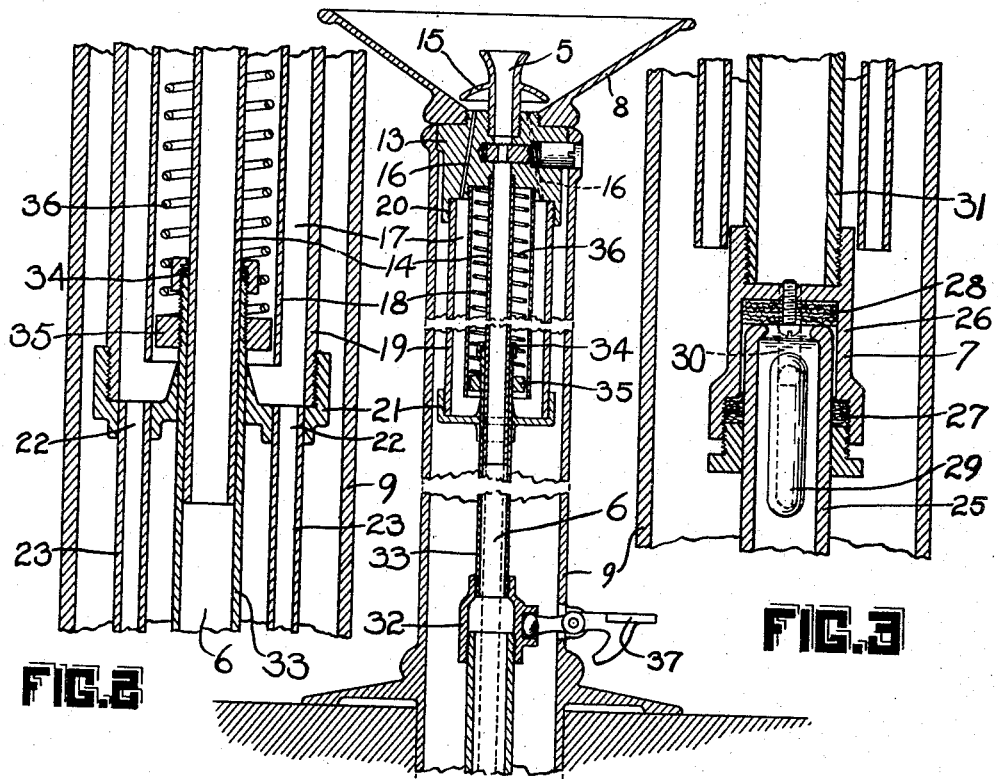
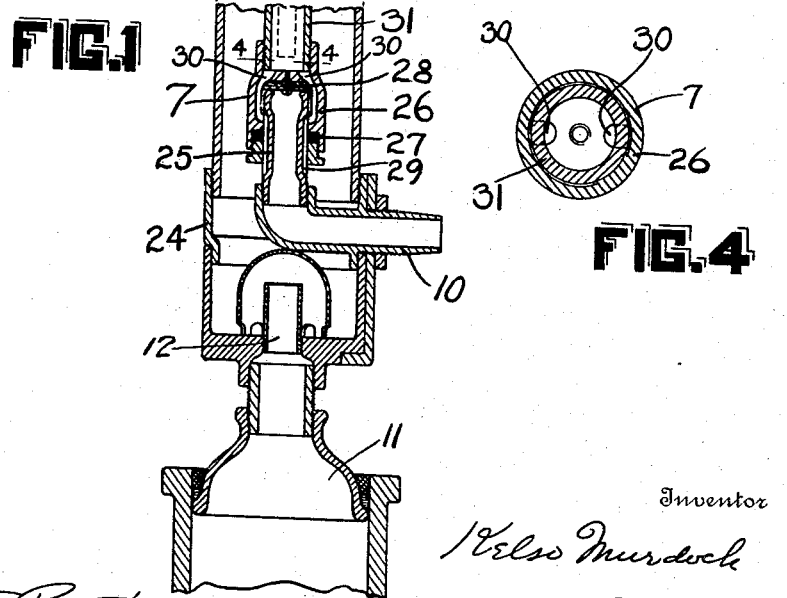

UNITED STATES PATENT OFFICE.

KELSO MURDOCK, OF CINCINNATI, OHIO.

DRINKING-FOUNTAIN.

1,218,797.  Specification of Letters Patent.  Patented Mar. 13, 1917.

Application filed January 2, 1912. Serial No. 669,015.

*To all whom it may concern:*

Be it known that I, KELSO MURDOCK, a citizen of the United States of America, and resident of Cincinnati, county of Hamilton, and State of Ohio, have invented certain new and useful Improvements in Drinking-Fountains, of which the following is a specification.

This invention relates to drinking fountains, and has for an object to produce a non-freezing fountain, that is, a fountain which may be used during freezing weather but which is provided with means for preventing it from freezing or from being rendered inoperative by an accumulation of ice.

This and other objects I attain by means of apparatus embodying features herein described, and illustrated in the drawings accompanying, and forming a part of this application.

In the drawings, Figure 1 is a vertical sectional view of a fountain embodying my invention, portions of the fountain being broken away for convenience of illustration.

Fig. 2 is a vertical sectional view taken at right angles to the section shown in Fig. 1.

Fig. 3 is a fragmental vertical sectional view of the apparatus shown in Fig. 1, and is taken on the same plane as Fig. 2.

Fig. 4 is a sectional view along the line 4—4 of Fig. 1.

The apparatus illustrated as an embodiment of my invention consists in part, of a bubbler 5, of any suitable kind, supply piping communicating with the bubbler, a foot controlled valve 7, for controlling the supply of water through the supply piping, a catch basin 8, for receiving the overflow from the bubbler, and an inclosing casing 9, which supports the catch basin 8 and the bubbler 5, and incloses the supply piping and the drainage passages for the catch basin 8.

The casing 9 is cylindrical and is provided at a point, intermediate its ends, with a circular foot, which is preferably formed integrally therewith and is employed in supporting the casing either on its foundation or on the ground. The portion of the casing below the foot is of such length that it is adapted to extend into the ground to a point below the frost-line. The casing is provided, at its lower end, with a water supply port through which extends a nipple 10 and below the supply port with a drainage 11, through which the over-flow from the catch basin is discharged into a sewer or any other suitable drain.

The catch basin 8 and the bubbler 5 are mounted on the top of the casing 9 in any suitable manner; in the apparatus illustrated I have provided a screw plug 13, which is threaded into the upper end of the casing 9 and is provided with an externally threaded centrally located projection on which the basin 8 is secured, a threaded aperture being provided in the bottom of the basin. The plug 13 is provided with a central aperture, which is threaded at each end and into the upper end of which the bubbler 5 is screwed. A pipe 14 is screwed into the lower end of this aperture and forms a portion of the supply piping 6 for the bubbler. The bubbler is provided with a projecting annular apron 15, which covers the upper ends of drainage apertures 16, formed in the plug 13 and provides a drainage passage between its circumferential edge and the basin. The apertures 16 are preferably arranged in an annular series and diverge in their downward passage through the plug so that their lower ends communicate with an annular passage 17 formed between a cylindrical apron 18, screwed into a threaded recess formed on the lower face of the plug 13, and a concentric cylindrical wall 19, which is threaded on to an internally threaded flange 20 of the plug. The wall 19 is concentric with the casing 9 and also with the piping 14.

The lower end of the annular passage 17 is closed by means of a cap-nut 21 which is secured to the lower end of the cylindrical wall 19 and is provided with a central aperture, through which the piping 14 projects. The cap-nut is also provided with apertures 22, with which downwardly extending pipes 23 communicate. The pipes 23 extend downwardly along each side of the supply piping to a point in the casing 9 below the frost-line. These pipes deliver the over-flow water from the catch basin to the lower end of the casing 9 from which it is discharged through the port 12.

The nipple 10 is formed in a special fitting 24, at its outer end is adapted to be connected to a water pipe, and at its inner end is curved upwardly and forms a support for a water inlet pipe or nozzle 25, on which a sleeve 26 is reciprocally mounted. The sleeve 26 carries a suitable packing 27, which surrounds the nozzle 25, and a valve disk 28, which is adapted to close the upper end of the nozzle. Oppositely located depressions 29 are provided in the cylindrical wall of the nozzle and form drainage passages between it and the packing, when the sleeve occupies the lowest position and the nozzle is closed by the disk 28. The disk 28, as illustrated, forms a diaphragm across the passage through the sleeve, but it is provided with diametrically opposite apertures 30, which form a means of communication between the nozzle 25 and a pipe 31, to which the sleeve is secured, when the sleeve is raised and the disk 28 is lifted off of the upper end of the nozzle.

The upper end of the pipe 31 is secured to a lever-actuated nipple 32 to which a pipe 33 is secured. The pipe 33 extends upwardly, telescopes the lower end of the pipe 14, and, extending through the central aperture in the cap-nut 21, projects along the pipe 14 below the apron 18. A packing 34 is carried by the upper end of the pipe 33 and seals the sliding joint between it and the pipe 14. A spring block 35 is mounted on the pipe 31 and forms a support for a coiled spring 36 which surrounds the pipe 14, abuts against the lower face of the plug 13, and is surrounded by the apron 18. The spring operates, through the spring block 35, the pipe 33 and the pipe 31 to force the sleeve 26 downwardly and to thereby close the upper end of the nozzle 25, and open the passages formed by the depressions 29. A foot-lever 37 is pivotally mounted on lugs formed integrally with the casing 9 and, projecting into the casing, operatively engaging the nipple 32 in such manner that the nipple is raised, in opposition to the tension of the spring 36, when the outer end of the lever is depressed.

By operating the foot lever as described, the sleeve 26 is raised and the upper end of the nozzle 16 is opened and the passages between the nozzle and the packing 25, formed by the depressions 29, are closed, due to the fact that the depressions are so located and are of such length, that the packing 25 moves past their upper ends during the upward motion of the sleeve 26 and prior to the time that the sleeve reaches its highest position. The lifting of the sleeve creates a flow of water from the source of supply, through the nozzle 25, and the connecting pipes, to the bubbler 5. The over-flow from the bubbler flows over the annular apron 15, between its edge and the basin and through the apertures 16 into the annular passage 17. From the annular passage the over-flow water is delivered, through the pipes 23 to the discharge port 12 in the lower end of the casing 9, as has been described. The apron 18 is sufficiently long to prevent the water, traversing the passage 17, from coming in contact with the spring 36, or the upper end of the pipe 33. This precaution is taken for the purpose of preventing the over-flow water from freezing on the spring and thereby rendering it inoperative and also to prevent it from freezing around the sliding joint between the pipes 33 and 14 and thereby preventing the pipe 33 from moving freely up and down the pipe 14. The packing 34 between the pipes 33 and 14 is located within the inclosing wall 19 so that any leakage which may take place at the joint between the pipes 14 and 33 will be discharged through the pipes 23 into the bottom of the casing 9. Another advantage obtained by locating the packing 34 near the upper end of the pipe 14 is that the bearing surface between the pipe 33 and the pipe 14 is increased and consequently the pipe 33 is more effectively guided in its motion along the pipe 14. The engagement of the packing 27, with the nozzle 25 also operates to guide and hold the pipes 31 and 33 in place.

The pipes 23 extend into the bottom portion of the casing 9 for the purpose of preventing the over-flow water from collecting and freezing on the interior mechanism of the fountain and particularly on and about the foot lever 37. With the arrangement of apparatus illustrated there is absolutely no chance for drainage or leakage water to freeze on and incapacitate the fountain since adequate drains are provided which will quickly discharge the water below the frost-line. In addition to this the cylindrical casing 9 tends to prevent freezing of the water in the fountain since it is so located that an annnular air space is provided between it and the interior water passages and the air confined tends to prevent the water in the pasages from freezing since air is a relatively poor conductor of heat. It will be understood that heat insulating material may be employed in connection with the air passages and that a packing may also be employed within the fountain for the purpose of increasing the heat insulating effect of the confined air.

After the fountain has been used and the foot lever 37 is released, the spring 36 moves the sleeve 26 downwardly and closes off the supply of water to the nozzle and also opens the drainage passages formed on each side of the nozzle and thereby permits the column of water, located in the pipe at the time the nozzle is closed, to drain into the bottom of the casing 9. This drainage of the water will be rapid since the upper end of the pipe is open and since there is no tendency for the passages formed by the depressions 29 to freeze up, they being located below the frost line.

It will be understood that while I have described one embodiment of my invention and its principles of operation that various changes, substitutions and modifications may be made in the apparatus, without departing from the spirit and scope of my invention as set forth by the appended claims.

What I claim is:

1. A drinking fountain comprising a hollow casing having a drainage port formed in its lower end, a bubbler and a catch basin mounted on said casing, a water delivery nozzle located in the lower portion of said casing, a valve for controlling the delivery of water through said nozzle, longitudinally shiftable piping for actuating said valve and for establishing communication between said nozzle and said bubbler, a pipe communicating with said bubbler and with which said piping is telescoped, a spring for engaging said piping and closing said valve, means for engaging said piping for actuating said valve, and drainage conduits communicating with said basin and disposed within said casing and inclosing said spring and the joint between said piping and said pipe.

2. In combination in a drinking fountain, a bubbler, supply piping therefor, a catch basin for said bubbler, a drainage conduit communicating therewith, a hollow casing having a discharge port at its lower end and inclosing said supply piping and said drainage conduit and supporting said bubbler and said catch basin, a valve for controlling the delivery of water through said supply piping located in the lower end of said casing, an actuating spring for said valve located in the upper end of said casing within said drainage conduit and an apron extending downwardly over said spring for protecting it from the drainage water passing through said passage.

3. In combination in a drinking fountain, a hollow casing, a bubbler mounted on said casing, a catch basin mounted on said casing, a supply piping extending upwardly and centrally through said casing and communicating with said bubbler and a drain conduit extending downwardly through said casing and comprising a cylindrical wall secured to said casing, and a cap-nut through which said piping extends and discharge pipes secured to said cap-nut and extending into the lower end of said casing.

KELSO MURDOCK.

Witnesses:
JNO. G. MURDOCK, Jr.,
WALTER F. MURRAY.

Copies of this patent may be obtained for five cents each, by addressing the "Commissioner of Patents, Washington, D. C."